United States Patent [19]
Fielding

[11] Patent Number: 5,135,551
[45] Date of Patent: Aug. 4, 1992

[54] MUFFLER WITH REPLACEABLE FILTERS

[76] Inventor: James L. Fielding, 700 2nd St., Neptune Beach, Fla. 32233

[21] Appl. No.: 565,492

[22] Filed: Aug. 10, 1990

[51] Int. Cl.⁵ .............................................. B01D 47/00
[52] U.S. Cl. ........................................ 55/233; 55/126; 55/316; 55/320; 55/486; 55/505; 55/510; 55/516; 55/DIG. 30; 60/310; 123/25 P; 261/18.2
[58] Field of Search .................. 55/124, 126, 316, 505, 55/506, 507, 516, DIG. 30, 508, 510, 233, 320, 486; 60/218, 310; 123/25 P; 261/18.2

[56] References Cited

U.S. PATENT DOCUMENTS

| | | | |
|---|---|---|---|
| 3,406,501 | 10/1968 | Watkins | 55/DIG. 30 X |
| 3,473,299 | 10/1969 | Powers | 55/DIG.30 X |
| 3,556,734 | 1/1971 | Peterson | 55/DIG. 30 X |
| 3,668,833 | 6/1972 | Cahill | 55/126 X |
| 3,675,398 | 7/1972 | Giarrizzo | 55/316 |
| 3,712,281 | 1/1973 | Ruth | 123/25 P X |
| 3,817,222 | 6/1974 | Staib | 60/310 X |
| 4,032,310 | 6/1977 | Ignoffo | 55/DIG. 30 X |
| 4,078,527 | 3/1978 | Yasuda | 123/25 P X |
| 4,301,652 | 11/1981 | Sohda et al. | 60/310 |
| 4,630,530 | 12/1986 | Eckstrom et al. | 55/126 X |

Primary Examiner—Charles Hart
Attorney, Agent, or Firm—John P. Halvonik

[57] ABSTRACT

The invention relates to an improved muffler for an automobile that filters the exhaust and eliminates noise and odor as well as forces steam back into the engine to improve gas mileage. The muffler uses replaceable cartridges that serve as filters to divide the muffler into chambers that filter and eliminate the noise of the exhaust. Each filter can be removed and cleaned as the need arises.

3 Claims, 1 Drawing Sheet

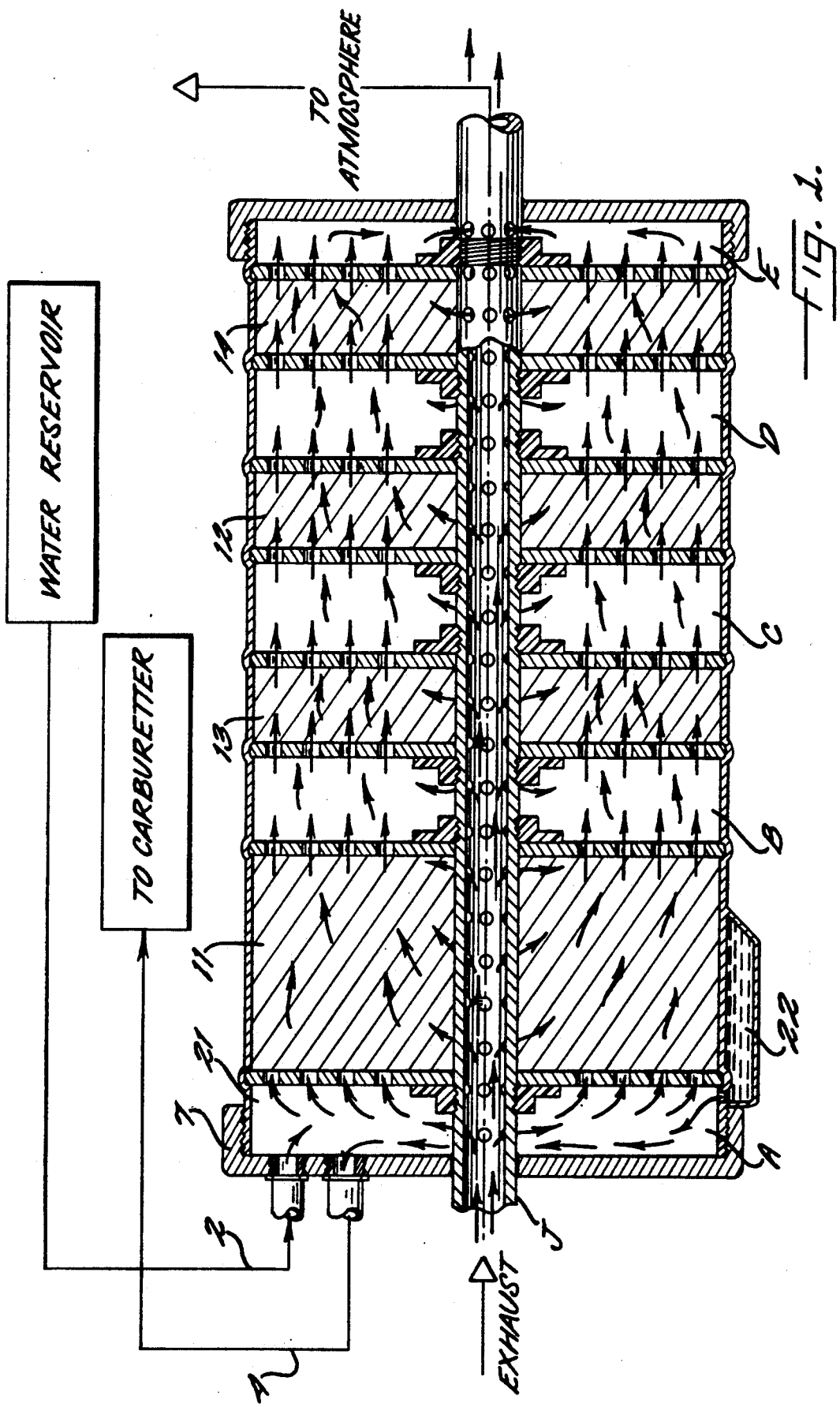

MUFFLER WITH REPLACEABLE FILTERS

FIELD OF THE INVENTION

The invention relates to the field of muffler devices and in particular to a muffler whose filters can filter the exhaust and can be replaced to facilitate cleaning. Each filter is a seperate piece that can be removed seperately from the rest of the filters.

DESCRIPTION OF THE PRIOR ART

While there are muffler devices that have seperate chambers, none that applicant is aware of have chambers that are removable for cleaning.

SUMMARY OF THE INVENTION

The invention comprises a series of cleaning filters to clean the exhaust alternating with baffle chambers to reduce noise. Each of the filters serves to divide the muffler into seperate baffle chambers. Each filter can be removed seperately to facilitate the cleaning of the system. The first stage of the muffler is a steam generating system that drips water onto a filter which is subsequently turned into steam which is then sent to the carburetor of the engine to improve the compression ratio. This in turn results in greater fuel efficiency, smoother running, etc. The final filter is an electrostatic filter to eliminate particles and odor. The muffler eleiminates hot spots that cause detonation or preignition and it cools the engine, causing it run smoother. The steam wil extend the life of the engine because the car will run smoother.

It is an objective of the invention to provide a muffler that has replaceable filters.

Another objective is to provide a muffler system whose individual filters can be removed and cleaned.

Another objective of the muffler is to clean pollutants out of the auto exhaust and eliminate noise.

Another objective of the invention is to provide a muffler that provides steam injection for the carburetor.

Still another objective of the invention is to provide a muffler with a filter with a cleaning solution reservoir that can be continually filled.

Yet another objective of the invention is to provide a muffler system that can be incorporated into autos, trucks, and aircraft.

Still another, is to provide a muffler system that can be incorporated into any internal combustion engine.

Another objective of the muffler is to remove harmful pollutants from the exhaust gases and reduce the gas components so that the air is returned to the atmosphere containing inert and non-toxic substances.

Yet another is to provide a muffler that can increase a combustion engine's performance while reducing the amount of fuel used.

Other advanatages of the invention should be readily apparent to those skilled in the art once the invention has been described.

DESCRIPTION OF THE FIGURES

FIG. 1 shows a cross section of the eliminator muffler

LIST OF ELEMENTS

2 Fluid supply line
4. Steam line
11 Filter wire mesh
12 Charcoal filter
13 Limestone filter
14 Electrostatic filter
A-E noise baffle chambers

DESCRIPTION OF THE PREFERRED EMBODIMENT

Each baffle is a seperate unit, see FIG. 1. The number of filters can vary, of course, but usually this will be about four and the corresponding number of filer would be four.

Each filter forms a wall of a baffle chamber. The filters serve to divide the muffler chamber into different baffle sections. Preferably each filter is a different type of filter which will be described shortly.

Each filter or baffle is seperately attached to the mufffler section and can be seperately removed from the muffler section. A preferred method of attaching the baffle is by having a central threaded pipe J that runs through the center of the muffler.

Each filter has a central thread engaging section that enables the section to be screwed onto the central pipe J. The central pipe also serves as a passageway for the exhaust gases as the gases go from one baffle chamber to another, see FIG. 2. A cross section of the filter is shown as FIG. 1. The filters 11 through 14 are designed to be built as seperate units that allow them to be unscrewed out of the housing for servicing, which typically involves cleaning the filter by washing and/or vacuuming or replacing the filter entirely. The washing can be with soaps and/or hydrocarbons.

The filters are round and are screwed together. The filters can also be readily replaced since they can come apart. Each filter contains porous material to allow the exhaust gases to go through and the center of each filter is open to allow the exhaust gases to pass through. Each filter thus creates a baffle chamber which serves to silence the sound of the gases in much the same way that a gun silencer works. The threaded pipe that goes the length of the filter is designed to prevent back pressure on engine.

The first chamber of the muffler 21 contains the cleaning solution. The first filter 11 may comprise, for example, a wire screen that has a cleaning solution dripped onto it from a reservoir. The cleaning fluid is provided in a reservoir that is connected to the first filter by means of a fluid line 2. This first filter should be the steam generating filter and it helps to reduce the temperature of the exhaust and decrease the noise. This filter produces steam that is sent to the engine and makes a cleaner exhaust. The water reservoir may be accessed from the trunk or there may be a seperate entry port for the reservoir in a manner similar to the gas tank refilling hole.

The cleaning fluid may be of a Sodium Bicarbonate solution or any aqueous solution that will clean, even water is a possibility since the point is to send steam into the engine. The line drips the liquid onto the filter where it is subsequently evaporated off. The fluid acts to clean and cool the exhaust gas. The evaporated gas is sent to the engine by the pressure that builds up in the baffle chamber 21 through the steam line 2. The fluid that doesn't evaporate collects in the tray 22 at the bottom of the filter. There is also some suction from the air intake of the engine that will pull the steam toward the carburetor. The steam enters the venturi of the carburetor of the engine and cools the combustion chamber and increases the compression ratio. The steam line has a thermostat or an electrical solenoid that opens when the engine is started. The liquid that is not turned to steam settles to the bottom of the filter, 11. The solenoid opens when ignition is turned on. This conserves the cleaning fluid in the water reservoir.

Moist air in the combustion chamber prevents hot spots and gives more power on the compression stroke of the engine. More power to the compression stroke will result in better gas mileage, smoother running engine, possibly longer engine life etc. This increases power by increasing the compression ratio and thus saves fuel and wear and tear on the engine since it runs smoother and cooler. The engine develops more power and cuts fuel consumption to attain the speed desired.

The central pipe prevents back pressure. The exhaust gas has to go through the filters or relief valves. The exhaust gas travels through all the filters being cleaned and neutralized.

Filter number 12 is preferably a limestone filter to clean the gas and neutralize the acids in it. Filter 13 should be a charcoal filter to take the odor out of the exhaust. The last filter should preferably be an electostatic filter 14 to remove any pollutants and small particles left in the exhaust. Intermediate filters are also possible.

The baffles are built along the lines of silencers on guns so as to cut out the noise of the muffler. Each filter is screwed onto the other filters or the head plate. By making the filters as compact units this should make them easier to service. It is intended that an industry may be built around this system that operates out of service stations. When an auto comes in for servicing the mechanic can check the filters to see if they need cleaning. The mechanic can unscrew each filter and check it.

The front of the head plate portion 7 that the filters screw onto will be attached to the main exhaust pipe coming from the engine. The back end of the central portion will be connected to the tail pipe so that the exhaust gases are sent to the atmosphere.

The muffler assembly (of which the central threaded portion, filters, and muffler cannister are a part of) will itself be readily attachable and detachable from the bottom of the automobile that it is attached to. The front and back ends of the muffler system and the exhaust system pipes that are attached to the front and back of the muffler system may be equipped with hangers that can be readily engaged onto a slot on the bottom of the auto in the same manner as modern mufflers. By a simple turn of the muffler, the system can be disengaged from the bottom of the auto and then the individual filters taken apart for cleaning.

The eliminator is designed to be equipped on autos, trucks, heavy equipment, aircraft and industrial stacks or equipment. The eliminator stops pollution and both odor and noise and puts clean air in the atmosphere. The eliminator muffler can be dimensioned to fit any size internal combustion engine.

I claim:

1. An improved automobile muffler for adding steam into the carburetor of an auto by using the exhaust gas of said engine, comprising:
    exhaust gas chamber having inlet and outlet means, said inlet means for inletting said exhaust gas from said engine into said chamber, at least one gas filtering means within said gas chamber, reservoir means for containing aqueous fluid, said reservoir means having feed means for disposing said fluid on said filtering means so that said fluid turns to steam upon contact with said exhaust gas, return means for allowing passage of said steam from said chamber to said carburetor so that said steam aids in combustion, wherein said chamber has a central passage with threads disposed upon the outside surface of said central passage, said filter having threaded portions capable of allowing said filter to be threadably attached to said central passage, said outlet means for exhausting said exhaust gases.

2. The apparatus of claim 1 wherein said feed means is capable of disposing said aqueous fluid onto said filter upon the ignition of said automobile.

3. The apparatus of claim 2 wherein said filters are wire mesh filters.

* * * * *